May 20, 1941.  E. W. AUSTIN  2,242,807
OIL FILTER
Filed Feb. 21, 1938
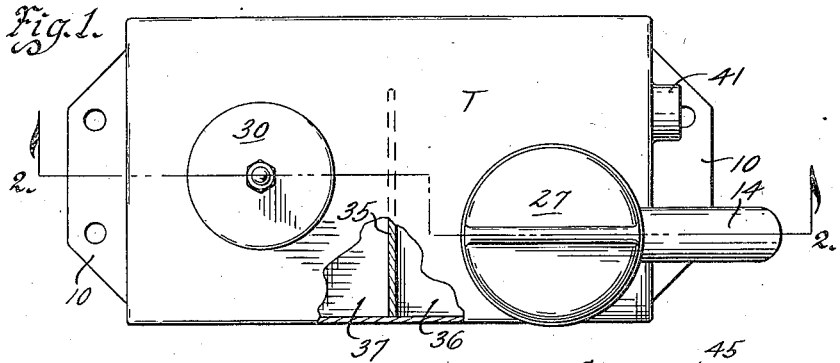
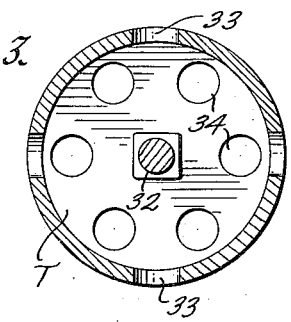
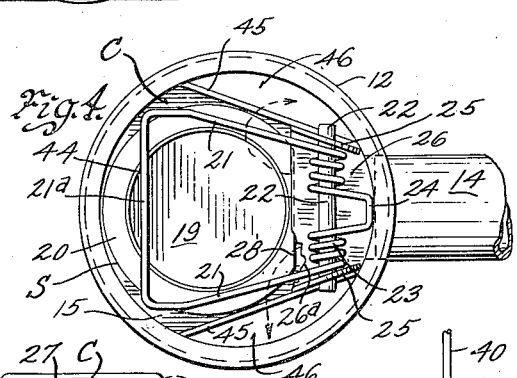
Inventor
Ellsworth W. Austin
by Bair & Freeman
Attorneys Patented May 20, 1941

2,242,807

UNITED STATES PATENT OFFICE 2,242,807

OIL FILTER

Ellsworth W. Austin, Cedar Rapids, Iowa, assignor to LaPlant-Choate Manufacturing Co. Inc., Cedar Rapids, Iowa, a corporation of Delaware Application February 21, 1938, Serial No. 191,633

9 Claims. (Cl. 210—154)

One object of my present invention is to provide an inexpensive oil strainer or filter structure in combination with an oil tank, the structure including a filter assembly which is readily removable for cleaning purposes and replaceable within an intake chamber of the structure.

Another object thereof is to provide a filter structure particularly adapted for use in connection with an oil reservoir of a hydraulic mechanism such as a jack or the like, fluid pressure being supplied to the jack in the form of oil under pressure pumped by an oil pump.

Another object is to provide an oil strainer or filter structure in which a strainer assembly is mounted so that oil either from a return or intake tube or from a filler tube passes through the strainer, the strainer preferably being provided with a lower portion of fine mesh and an upper portion of coarse mesh, so that the oil normally is strained through the fine mesh portion, but if this portion becomes clogged, it can flow through the coarse mesh portion until such time as the strainer is removed and cleaned.

Still another object is to provide a baffle arrangement so that if the quantity of oil passing through the strainer is in excess of that which the strainer will pass, the oil can rise over the baffle and bypass the strainer without causing back pressure on the return tube.

A further object is to provide a reservoir tank with an intake chamber in which the strainer is removably positioned, a retainer lever being biased to normally retain the strainer in position and the intake chamber constituting a filler tube for the tank which tube is provided with a removable cover so that additional oil can be introduced into the reservoir tank when desired, a deflector plate being arranged within the intake chamber to prevent return oil from a return tube connected to the intake chamber from passing out through the open filler tube when the supply of oil for the reservoir is replenished while the filter structure is in operation.

Still a further object is to provide, in connection with a reservoir tank and filter structure, a breather tube which is located remotely from the strainer assembly, a baffle plate being provided in the reservoir between the strainer assembly and the breather tube to prevent any undesirable splashing of oil out through the breather tube.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of an oil strainer of filter structure embodying my invention, part of the top of the oil tank being broken away and certain walls thereof being shown in section.

Figure 2 is a sectional view on the line 2—2 of Figure 1 and in connection with this figure, hydraulic mechanism is shown diagrammatically.

Figure 3 is an enlarged sectional view on the line 3—3 of Figure 2 showing the breather tube construction; and Figure 4 is an enlarged plan view of an intake chamber and return tube of the filter structure.

On the accompanying drawing I have used the reference character T to indicate a substantially closed oil reservoir or tank. The tank T may be formed of heavy sheet metal plates welded together to make the tank liquid tight. Brackets 10 are welded to the bottom of the tank whereby the tank may be mounted in position as on a tractor or the like.

An intake chamber C is provided within a filler tube 12. The tube 12 is welded in an opening 13 in the top of the tank T. Communicating with one side of the filler tube 12 is an intake or return tube 14. Within the tube 12, I provide a partition 15. The partition 15 has an opening 16 therein through which a strainer assembly S may be projected to the position shown by full lines in Figure 2.

The strainer assembly S comprises a cylinder 17 having perforations 18 in the wall thereof. An imperforate bottom 19 is provided for the cylinder 17 while at its upper end an out-turned supporting flange 20 is provided. The flange 20 is adapted to rest on the partition 15 surrounding the opening 17 therein.

For normally retaining the strainer assembly S in position I provide a retainer lever 21 pivoted as on a pin 22. The lever 21 may be made of spring wire, coiled about the pin 22 as at 23 and terminating in an arm 24 engaging the side of the filler tube 12 so as to bias the lever 21 into engagement with the flange 20. A cross member 21a of the lever 21 can be engaged by the fingers of the operator and the lever thereby swung to the dotted line position of Figure 2 when it is desirable to remove the strainer assembly S for the purpose of cleaning it or replacing it with an new one.

The pin 22 is supported in ears 25 extending upwardly at the ends of a deflector plate 26. The deflector plate 26 is mounted in the filler tube 12 in such position that it deflects oil entering from the return tube 14 downwardly into the strainer assembly S as shown by the solid line arrows in Figure 2. The deflector 26 also prevents splashing of oil from the return tube 14 out of the top of the filler tube 12 when the filler tube is open for the purpose of pouring additional oil into the tank T. The top of the tube 12 is normally closed by a filler tube cap 27 which is illustrated as being screwed thereon.

The supporting flange 20 of the strainer assembly S is cut away as indicated at 28 (see Figure 4) to clear the left-hand edge of the deflector plate 26 which has been shown broken away at 26a to illustrate the cut-away edge 28. Such clearance is necessary during the removal and replacing of the strainer assembly.

A breather tube 29 is welded to the top of the tank T at a position remote from the top of the filler tube 12. A cover plate 30 is provided for the breather tube which is normally held in position by a nut 31 secured to a bolt 32. The head of the bolt is welded to the top of the tank T. The breather tube 29 has vent openings in the form of notches 33 in the upper edge thereof.

Communication between the breather tube and the interior of the tank is afforded by openings 34 in the top of the tank. Between the breather tube 29 and the strainer assembly S, I provide a baffle wall 35 which, as illustrated by dotted lines in Figure 1, terminates short of one side of the tank to provide oil and air communication between one compartment 36 of the tank containing the strainer assembly and another compartment 37 thereof communicating with the breather tube.

The filter structure described is adaptable for use in connection with a hydraulic jack J such as the type used in earth moving machines or snow plows for raising bulldozer or snow plow blades or the like. The jack is shown diagrammatically in Figure 2 and comprises a cylinder having a piston 39 therein connected with an operating stem 40. Oil is supplied from the tank T through a suction port 41 thereof to a pump P and returns through a valve V to the return tube 14. The valve V can be rotated a fourth revolution to the right for causing the piston 29 to move upwardly or a fourth revolution to the left to cause it to move downwardly. When the valve is in the position illustrated, the oil flows through a passage 42 thereof, thus causing the oil to constantly circulate, whether the jack is in motion or locked at rest by the valve V when in its closed position.

My strainer or filter structure is particularly adapted for the types of machines mentioned as it can be ruggedly constructed and the filter itself is mounted out of the way and protected from damage by being enclosed within the tank T. The strainer assembly, however, is readily removable for the purpose of being cleaned when it becomes clogged while the same tube through which it is removed can be used as a filler tube.

The deflector 26 serves the purpose of normally deflecting oil as desired to pass through a fine mesh lower portion 43 of the strainer assembly S as shown by the solid line arrows of Figure 2. If this portion of the strainer assembly becomes clogged, the oil can pass as indicated by the dash line arrows through a coarse mesh portion 44 of the strainer. If the mesh 44 also becomes clogged or if more oil is discharged into the intake chamber C than will pass through the strainer, some of the oil will be discharged as indicated by the dotted line arrows (see also Figure 4) over baffle plates 45 mounted in the intake chamber C. These plates extend upwardly from the partition plate 15 and the partition has bypass openings 46 through which the overflowing oil can pass back into the tank T. Likewise when filling the tank T through the filler tube 12, excessive oil is taken care of by flowing over the baffles 45.

Oil used in connection with hydraulic jacks of the character mentioned is usually quite heavy and this is particularly true in cold weather. Provision has been made in my device whereby the bypass openings 46 take care of excess oil when its viscosity is such that the strainer S cannot pass all the oil that pours into it. The breather tube 29 takes care of changes in volume of the oil caused by temperature changes and by displacement of the piston rod 40, etc., without permitting oil pumped from the pump P to splash out thru the breather tube. The breather tube is mounted remote from the strainer for this purpose and the baffle wall 35 is provided as a means to aid in the prevention of oil splashing out through the breather tube.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an oil strainer structure, an intake chamber having a partition therein, a first opening in said partition, a strainer assembly inserted through said first opening in said partition and supported relative thereto, said strainer assembly being thereby removable from said first opening in said partition, an intake tube communicating with said intake chamber, a baffle within said intake chamber, extending upwardly from said partition, said first opening being in front of said baffle and said partition having a second opening back of said baffle for bypassing oil from said intake chamber when the oil entering said intake chamber is in excess of the amount said strainer is capable of passing.

2. In an oil strainer or filter structure, an oil tank, an intake chamber therefor having a partition therein, an opening in said partition, a strainer assembly, an intake tube communicating with said intake chamber, said strainer assembly being removable from said opening in said partition and a retainer pivotally mounted in said intake chamber and biased to engage said strainer assembly and thereby normally retain it in position, said retainer being swingable to a position permitting removal of said strainer assembly.

3. In an oil strainer, an intake chamber, a cap therefor, a strainer assembly having an intake in said intake chamber, an intake tube communicating with said intake chamber, a retainer biased to engage said strainer assembly and thereby normally retain it in position, said retainer being swingable to non-retaining position when said cap is removed, a baffle within said intake chamber and extending upwardly from said strainer assembly, said intake chamber having an opening back of said baffle for bypassing oil from said intake chamber around said strainer assembly and said strainer assembly being mounted in front of said baffle.

4. In an oil filter structure, an oil tank, a tubular intake chamber therefor, a strainer assembly affording communication between said intake chamber and said tank and a baffle plate within said tubular intake chamber and arranged as a chord thereof, said intake chamber having an opening back of said baffle for bypassing oil from said intake chamber to said tank when the quantity of oil entering said intake chamber is in excess of the amount said strainer is capable of passing and said strainer being located in front of said baffle.

5. In a strainer structure of the character disclosed, an oil tank, an intake chamber therefor and a strainer assembly providing communication between said intake chamber and said tank, said strainer assembly having a lower portion of fine mesh and an upper portion of coarse mesh.

6. In a strainer structure of the character disclosed, an oil tank, an intake chamber therefor, a strainer assembly providing communication between said intake chamber and said tank, said intake chamber constituting a filler tube for said tank, a cover for said filler tube, said cover being located over said strainer assembly, a baffle within said intake chamber at the side of said strainer assembly, said intake chamber having an opening on the side of said baffle opposite said strainer assembly for bypassing oil from said intake chamber to said tank when the quantity of oil entering said intake chamber is excessive.

7. In a strainer structure, an oil tank, an intake chamber therefor, a strainer assembly providing communication between said intake chamber and tank, said strainer assembly having a lower portion of fine mesh and an upper portion of coarse mesh, and a baffle within said intake chamber, said intake chamber having an opening back of said baffle for bypassing oil from said intake chamber to said tank when the oil entering said intake chamber is in excess of the amount said strainer is capable of passing.

8. In a strainer structure of the character disclosed, an oil tank, an intake chamber therefor, a strainer assembly providing communication between said intake chamber and tank, said intake chamber constituting a filler tube for said tank, a cover for said filler tube, said cover being located over said strainer assembly whereby it receives oil poured through said filler tube, an intake tube connected with the side of said intake chamber, a deflector positioned within said intake chamber to deflect oil from said intake tube toward said strainer assembly and prevent discharge of oil from said intake tube out through said filler tube, a breather tube communicating with said tank, said breather tube being remotely spaced from said strainer assembly, a baffle plate between said strainer assembly and said breather tube, said breather tube comprising a cylindrical member surmounting the top of said tank, perforations in said breather tube within the outline of said cylindrical member and a cover for said cylindrical member, said cylindrical member having notches in its upper edge for porting the interior of said cylindrical member to atmosphere.

9. In a strainer structure of the character disclosed, an oil tank, an intake chamber therefor, a strainer assembly providing communication between said intake chamber and tank, said intake chamber constituting a filler tube for said tank, a cover for said filler tube, said cover being located over said strainer assembly, an intake tube connected with the side of said intake chamber, a deflector positioned within said intake chamber to deflect oil from said intake tube toward said strainer assembly and prevent discharge of oil from said intake tube out through said filler tube, a breather tube communicating with said tank, said breather tube being remotely spaced from said strainer assembly and a baffle plate between said strainer assembly and said breather tube.

ELLSWORTH W. AUSTIN.